(12) United States Patent
Wetherell

(10) Patent No.: US 9,662,757 B2
(45) Date of Patent: May 30, 2017

(54) CONCRETE CUTTING, POLISHING AND COLORING TREATMENT SOLUTIONS AND METHODS

(71) Applicant: Global Polishing Systems LLC, Henderson, NV (US)

(72) Inventor: Mark Wetherell, Henderson, NV (US)

(73) Assignee: Global Polishing Systems, LLC, Henderson, NV (US)

(*) Notice: Subject to any disclaimer, the term of this patent is extended or adjusted under 35 U.S.C. 154(b) by 0 days.

(21) Appl. No.: 14/725,292

(22) Filed: May 29, 2015

(65) Prior Publication Data

US 2016/0136770 A1    May 19, 2016

Related U.S. Application Data

(63) Continuation of application No. 14/171,608, filed on Feb. 3, 2014, now Pat. No. 9,073,165.

(60) Provisional application No. 61/759,879, filed on Feb. 1, 2013.

(51) Int. Cl.

| B24B 1/00 | (2006.01) |
|---|---|
| B24B 37/04 | (2012.01) |
| B24B 7/18 | (2006.01) |
| B28D 1/20 | (2006.01) |
| E04F 15/12 | (2006.01) |
| E04F 21/24 | (2006.01) |
| B24B 7/22 | (2006.01) |
| C04B 41/50 | (2006.01) |
| C04B 41/00 | (2006.01) |
| C04B 41/68 | (2006.01) |

(52) U.S. Cl.
CPC .............. B24B 1/00 (2013.01); B24B 7/18 (2013.01); B24B 7/186 (2013.01); B24B 7/22 (2013.01); B24B 37/044 (2013.01); B28D 1/20 (2013.01); C04B 41/009 (2013.01); C04B 41/5089 (2013.01); C04B 41/68 (2013.01); E04F 15/12 (2013.01); E04F 21/24 (2013.01); B24B 1/007 (2013.01)

(58) Field of Classification Search
CPC .. B24B 1/00; B24B 1/007; B24B 7/18; B24B 7/22; B24B 7/224; B24B 7/226; B24B 7/186; B24B 37/042; B24B 37/044; B28D 1/00; B28D 1/20; E04F 21/24
See application file for complete search history.

(56) References Cited

U.S. PATENT DOCUMENTS

| 3,976,497 | A | 8/1976 | Clark |
|---|---|---|---|
| 4,098,363 | A | 7/1978 | Rohde et al. |
| 4,232,980 | A | 11/1980 | Tertinek et al. |
| 4,303,136 | A | 12/1981 | Ball |
| 4,330,446 | A | 5/1982 | Miyosawa |
| 4,452,324 | A | 6/1984 | Jurgens |
| 4,471,845 | A | 9/1984 | Jurgens |
| 4,606,418 | A | 8/1986 | Thompson |
| 4,788,509 | A | 11/1988 | Bahl et al. |
| 4,852,671 | A | 8/1989 | Southland |
| 4,883,132 | A | 11/1989 | Tibbitts |
| 4,913,244 | A | 4/1990 | Trujillo |
| 5,355,954 | A | 10/1994 | Onan et al. |
| 5,356,671 | A | 10/1994 | Drs |
| 5,370,919 | A | 12/1994 | Fieuws et al. |
| 5,431,852 | A | 7/1995 | Kaijou |
| 5,695,811 | A | 12/1997 | Andersen et al. |
| 5,750,276 | A | 5/1998 | Page |
| 5,895,688 | A | 4/1999 | Bertoncini et al. |
| 5,945,169 | A | 8/1999 | Netti et al. |
| 6,155,907 | A | 12/2000 | Jones |
| 6,187,851 | B1 | 2/2001 | Netti et al. |
| 6,347,456 | B1 | 2/2002 | Jones et al. |
| 6,454,632 | B1 * | 9/2002 | Jones et al. ............... 451/28 |
| RE38,364 | E * | 12/2003 | Wetherell et al. .......... 451/28 |
| 6,800,130 | B2 | 10/2004 | Greenwood et al. |
| 7,013,973 | B2 | 3/2006 | Danican et al. |
| 7,255,513 | B2 * | 8/2007 | Lampley et al. .......... 404/112 |
| 7,588,090 | B2 | 9/2009 | Dairon et al. |
| 7,737,195 | B2 | 6/2010 | Gimvang |
| 7,775,741 | B2 * | 8/2010 | Copoulos .................. 404/112 |
| 8,092,588 | B2 | 1/2012 | Bowers |

(Continued)

FOREIGN PATENT DOCUMENTS

| JP | 2004314328 A | 11/2004 |
|---|---|---|
| JP | 2009-114047 | 5/2009 |
| WO | WO 2004/035473 | 4/2004 |
| WO | WO 2013/049324 | 4/2013 |

OTHER PUBLICATIONS

"Basic know-how about silica", eka Industrial Specialties—Questions and Answers, Brochure, EKA Chemical Brochure, https://web.archive.org/web/20060617043238/http://www.colloidalsilica.com/eka.asp, © Copyright 2002 Eka Chemicals, Industrial Specialties, Mar. 21, 2006, 8 pages.

"Lythic™ Solutions for Polished Concrete—The Difference in Densifiers™", Lythic™, http://thesherwoodgroup.com/websites/lythic, © 2008 Lythic Solutions, Inc., date unknown, 1 page.

"Lythic™ Solutions: Products—The Difference in Densifiers™", Lythic Solutions Products: Densifier, Protector, Cleaner, http://thesherwoodgroup.com/websites/lythic/products.html, © 2008 Lythic Solutions, Inc., date unknown, 1 page.

Steven H. Miller, "Concrete Floors make a polished presentation", Seattle Dialy Journal of Commerce, Copyright 2015 Seattle Daily Journal of Commerce, http://www.djc.com/news/co/12005499.html?action+get&id+12005499&printmode_=true, 4 pages, May 1, 2009.

(Continued)

*Primary Examiner* — Timothy V Eley
(74) *Attorney, Agent, or Firm* — Weide & Miller, Ltd.

(57) ABSTRACT

Systems and methods for treating concrete, which includes the steps of wetting a surface of concrete with a amorphous colloidal silica, allowing time for the colloidal silica to penetrate the concrete surface, and cutting the surface of the concrete with a bladed tool wherein the longitudinal blade portion is positioned approximately at an angle between 30 degrees and 90 degrees relative to the surface of the concrete.

16 Claims, No Drawings

(56) References Cited

U.S. PATENT DOCUMENTS

| | | | |
|---|---|---|---|
| 8,460,058 B2* | 6/2013 | Yoshida et al. | 451/11 |
| 8,852,334 B1 | 10/2014 | Hills et al. | |
| 8,999,056 B1 | 4/2015 | Hills et al. | |
| 9,272,951 B1 | 3/2016 | Hills et al. | |
| 2004/0076470 A1 | 4/2004 | Goossens | |
| 2006/0083589 A1* | 4/2006 | McClain | 404/112 |
| 2008/0019774 A1 | 1/2008 | Stenzel | |
| 2008/0081217 A1 | 4/2008 | Bowers | |
| 2009/0050018 A1 | 2/2009 | Kishimoto | |
| 2009/0110834 A1 | 4/2009 | Gimvang | |
| 2009/0142604 A1 | 6/2009 | Imai et al. | |
| 2009/0169750 A1 | 7/2009 | Wilkins et al. | |
| 2009/0221212 A1 | 9/2009 | Palushaj | |

OTHER PUBLICATIONS

Aquron 2000® Sub-surface Molecular Bonding & Waterproofing Solution Treatment for Concrete Manual, © Markham Distributing © Aquron Corporation, Apr. 2002, 20 pages.

"Colloidal Silica—Silifog®", Lab Korea, http://www.labkorea.com/products/chemical/silica/colloidalsilica.html, ESEL TechTra Inc. Copyright 1998, Oct. 18, 2004, 9 pages.

"Savvy Densifier", Atech Plus Concrete Solutions, Atech Solutions Pty Ltd. www.atechproducts.com.au, 2 pages.

"Concrete Curing Agent", Lythic Solutions™ Sales Sheet, Lythic Solutions, Inc., www.lythic.net, date unknown, 1 page.

"Zered Wet Resin Polishing Pad, D-series—SleepWell—PP-D", Diamond Tools from Zered, Inc. Mikury Wire, Metal Pad, Concrete Ploishing Pad, Grinding, http://www.zeredinc.com/Prodcut/ItemDetailView.aspx?ProductID=73&DirName=%20S, © Copyright 2013 Zered, Inc., printed Apr. 15, 2016, 2 pages.

NW Stone Restoration's Proposal dated Sep. 21, 2004, Invoice No. 1562 and Credit Memo No. 1580, NorthWest Stone Restoration, Inc., 3 pages.

Letter to Larry Lindland, SILCO2 International inc., www.nwstonerestoration.com, Brad Sleeper, General Manager, Sustainable Flooring Solutions, May 7, 2007, 1 page.

Invoice No. 0006218-IN to Northwest Stone Restorations from SILCO2 International, Inc., SILCO2 International, Inc., Aug. 23, 2006, 1 page.

* cited by examiner

CONCRETE CUTTING, POLISHING AND COLORING TREATMENT SOLUTIONS AND METHODS

CROSS-REFERENCE TO RELATED APPLICATIONS

This application is a continuation of U.S. patent application Ser. No. 14/171,608, filed Feb. 3, 2014, which claims priority to U.S. Provisional Application No. 61/759,879, filed Feb. 1, 2013, the disclosures of which are incorporated herein be reference.

TECHNICAL FIELD

The invention, in various embodiments, relates generally to methods and products for use in treating concrete, masonry, or stone, and, more specifically, for use in the grinding and polishing of concrete.

BACKGROUND OF THE INVENTION

Concrete is a composite material generally defined as a mixture of two components, aggregates and paste. The paste, which typically includes cement, commonly Portland cement, and water, binds the aggregates (sand and gravel or crushed stone) into a rocklike mass as the paste hardens. The paste hardens because of the chemical hydration reaction between the cement and water.

Concrete surfaces have traditionally been polished using a series of finer and finer abrasives in order to produce a shiny, hard, durable surface. These abrasives have been attached to a machine in order to move them across the surface. These machines are by nature heavy and normally have a fairly rigid deck which is difficult or at least cumbersome to maneuver.

The majority of concrete slabs are not flat. As machines with fixed abrasives move across the surface, the larger sized grit abrasives used extend further down into the undulations on the surface and leave scratches in the low spots. These low spots are very difficult to remove since the abrasive on the next grit of diamond tools only extends outward about half as far as the previous diamond. It therefore cannot reach the low spot created by the abrasive. This issue can often result in exposing the aggregate, because as each diamond is used, it is necessary to drive it down against the surface to try to remove the scratches left from the previous tool. As stock is removed, it requires working either in dust if cutting dry or through a slurry if cutting wet. It is difficult to see what is being accomplished under either condition. If the concrete is hard and the tool being worked with is too hard to fret then the diamonds will glaze and not remove the previous scratch. If a dry resin bonded diamonds are used then the scratches fill with resin which comes out later. The end product of dry polished floors is a high gloss with little to no clarity in the floor.

It should be readily apparent from the above that the problems with the grinding and polishing processes are many and varied. Accordingly, there is a continuing need to improve upon existing concrete cutting and polishing systems and methods.

SUMMARY OF THE INVENTION

In some embodiments, the invention is directed to a cutting compound that provides several advantageous in conjunction to stock removal and polishing. The cutting material acts as the abrasive so that the machine does not have to use progressive grits of diamond abrasives applied to the surface of the floor. This compound of the invention is used in conjunction with the shape and angle of the tool according to the method of the invention in order to remove material from the floor while at the same time not producing the traditional scratches. This compound is substantially neutral in pH until it has been activated by a catalyst. The particle size begins a transformation in size due to the catalyst. The benefit of this system is that it doesn't rely on the abrasive in the tool to create scratches, but rather, it uses the edge of the tool to literally shave the surface of the concrete to produce an end result. Since it does not create scratches in the floor, there are no scratched to be removed.

Some embodiments are directed to a method for grinding and polishing dried concrete, comprising the steps of: wetting a surface of dried concrete with a solution including amorphous colloidal silica; permitting the colloidal silica to penetrate the concrete surface for a period of time, cutting the surface of the concrete with a bladed tool having the blade portion at an approximate at an angle between 30 degrees and 90 degrees relative to the surface of the concrete.

In some embodiments, wetting the surface includes soaking the surface with the amorphous colloidal silica. The method may further include the step of soaking the surface with water or an aqueous solution before wetting the surface with the amorphous colloidal silica. In some embodiments, wherein the process of cutting the surface comprises shaving and removing the surface ridges from the concrete surface. The method may further include the step of applying a densifier to the cut surface. In some embodiments, the method further includes the steps of allowing the surface to dry and applying a coloring product.

DETAILED DESCRIPTION OF THE INVENTION

The invention is directed to methods for grinding and polishing concrete and compounds for facilitating such methods.

Rather than cutting the concrete with a variety of diamond abrasive grits, the method of the invention involves wetting the concrete with a compound prior to applying a tool to shave the ridges on the concrete. The compounds of the invention are used for facilitating the stock removal and polishing of concrete.

The compound which may be used according to the non-limiting exemplary methods described herein below may comprise amorphous colloidal silicas and a fluid which exhibits hydrophobic properties when applied to the concrete. In some embodiments, the colloidal silicas have a particle size which ranges from about 1 to about 10 nanometers. In other embodiments, the colloidal silicas have a particle size which ranges from about 3 nm to about 9 nm. In some embodiments, the aforementioned compound further includes one or more surfactants. Other ingredients may include water, disinfectants and fragrances.

Dried concrete may have pores in the size range of 30 nm in diameter, while the amorphous colloidal silica in solution is about 7 nm in diameter. The solution, which may be water, carries the amorphous colloidal silica into the slab via capillary action through the larger concrete pores. After a period of dwell time, the amorphous colloidal silica has been found to penetrate to about 10 to about 12 mm into the concrete slab.

After wetting the concrete slab with the solution containing amorphous silica, the method of the invention then includes the step of "shaving" the concrete by applying the blade of a tool to the surface of the wetted concrete slab at an angle, which may be from about 1 degrees to about 90 degrees relative to the plane of the surface, but is preferably between 30 degrees and 50 degrees relative to the plane of the surface.

The application of the tool also applies pressure to the solution wetting the concrete surface which facilitates driving the amorphous colloidal silica deeper into the slab. It has been found that the amorphous colloidal silica will penetrate as much as 18 mm into the concrete slab with the application of pressure.

Once into the slab, the amorphous silica has been found to crosslink with the lime, Portland cement and sodium silicate in the slab, thus hardening the slab. In addition, the amorphous silica will link with the concrete shavings and dust, thus reducing dust in the atmosphere while also further hardening the concrete slab.

Since the shape of the tool does the work as much stock can be removed from the floor as needed with a single tool. It does not matter if it is a 30 grit tool or a 400 grit tool and no progressive use of grits is needed. If abrasives are encapsulated in the bond of the tool, then the tool can only create scratches that are the size of the abrasive. As discussed above, a 30 grit tool will only create a 30 grit scratch. Once it achieves a consistent 30 grit scratch it will not remove any more material. If the tool is not exposing fresh material then the surface heats, the tool will glaze and not take any more material off of the surface. With the cutting compound of the invention only a single bond of the tool is needed.

Traditional methods require hard, medium, and soft bonds in order to effectively remove stock, which require knowledge of the hardness of the slab in order to properly pick the proper tool to do the work. Hard bonded tools are required for soft concrete and soft bonded tools are required for hard concrete. If a hard bonded tool is used on hard concrete then the tool will glaze and not work. If the tool is run too fast then it will heat up and glaze. If a soft tool is run on soft concrete then it will wear out very quickly. With the cutting compound of the invention, it is not necessary to know the hardness of the concrete.

The cutting compound of the invention reduces the labor required to grind or polish the floor. Traditional methods require a diamond abrasive that is half as large as the previous diamond. This is true because the base of the cut never changes; only the peaks of the scratches are removed. So a sequence of tools starting with 30 would be 30, 50, 100, 50 semi metal, 100 resin, 200 resin, 400 resin, 800 resin. To achieve the same level of finish with the cutting compound would be 30 metals, 100 metals, 400 ceramic, 800 resins. Labor is reduced by a minimum of 50%. There are no incomplete scratches in the surface because the edge of the tool is being used and not the diamond abrasives. The last two steps traditionally completed with such tools may be replaced using the compound and products of the invention with zero diamond abrasives in the tool. There has been no difference in the end product. Because the abrasive is not fixed there is no drag on the surface. There is no roll out of the aggregate in the surface. The profile in the surface is consistent. The aggregate and the matrix cut at the same rate. Traditional means and methods create a significant amount of rollout because it cuts like the tip of a knife. When it hits a piece of sand or aggregate the hard material rolls out of the surface. The result of using the cutting compound is a denser more uniform polish as there are no voids in the surface of the polish since the abrasive is not fixed it is free floating.

The cutting compound of the invention does not require a heavy piece of equipment to remove significant amounts of stock from the slab. The cutting compound is wetter than water. Concrete cuts more easily when it is wet. Surface temperatures are reduced and abrasives don't glaze because they are cool. The cutting compound is abrasive and the abrasive is smaller than the porosity of the slab. The longer the dwell time of cutting compound the deeper into the slab it will penetrate. By moving the compound into the concrete it makes the concrete easier to cut.

The compound of the invention will not cut after it has dried it will however polish. If heavy aggregate exposure is desired then starting with a metal bonded rectangular tool is appropriate. If a surface cream polish is desired, then starting with a chamfered ceramic tool is appropriate. The angle that the tool addresses the surface of the concrete will determine the amount of material that is removed. After you have determined what tool to begin your work you would go through the sequence of tools to achieve the desired results. For heavy stock removal use a tool that has a 90 degree edge to the tool, this would include rectangles, squares, straight edge, rombus any metal bonded tool where the edge comes straight down and the face on the floor creates a 90 degree edge. For moderate stock removal use a tool that has a radius edge on the outside of the tool and a 90 degree edge on the inside of the tool. The radius edge does not gouge the surface and the 90 degree interior edge still removes a significant amount of stock. For light stock removal a chamfered edge of less than 90 degrees is required. An interior edge of 90 is still acceptable but not required.

In some embodiments, a dry resin may be applied as the last step to produce a high polish. The surface may then be tested by applying water to floor and letting it sit for approximately three minutes. Enlarge the area occupied by water if the area under the original area is darker than the last area wet there is penetration. If it is all the same color the surface must be opened by either mechanical or chemical means. Super saturating the surface with water will create an environment that allows for aggressive deep cutting of the concrete.

In some embodiments, the method of the invention includes spraying the compound of the invention with amorphous colloidal silica onto the surface, allowing it to sit for 30 minutes and then grind the surface to produce slurry that has the consistency of heavy shaving cream. This will facilitate cutting the concrete by applying the blade to shave the concrete surface. Water may be needed to add to the material to keep it from drying out. As more concrete is removed from the slab, the material may tend to dry out.

Color may also be added to the concrete using a coloring product as described herein. In some embodiments, the coloring product includes the materials as shown in the table below:

| Ingredient | % | CAS # | OSHA | ACGIH | OTHER |
| --- | --- | --- | --- | --- | --- |
| Silica, amorphous, precipitated | 10-15% | 7631-86-9 | 80 mg/M$^3$/ % SiO$_2$ | 10 ppm |
| 2-Butoxyethanol | | 111-76-2 | 50 ppm | 20 ppm | N/A |
| Glycol Ether DB | | 112-34-5 | 50 ppm | 20 ppm | N/A |
| Glycol Ether EP | | 2807-30-9 | Not Established | Not Established | |

-continued

| Ingredient | % | CAS # | OSHA | ACGIH | OTHER |
|---|---|---|---|---|---|
| propan-2-ol | 5-7% | 67-63-0 | 400 ppm | 400 ppm | |
| Cr (III) (complexed in dye | 2-5% | 7440-47-3 | 0.5 mg/m$^3$ | 0.5 mg/m$^3$ | |
| Water | 60-70% | 7732-18-5 | Not Established | Not Established | N/A |

Coloring products, such as those described herein, can be used with any carrier to impart color into concrete, such as water, acetone, or chemical densifiers. One advantage of the coloring product of the invention is that it is 100% miscible and hydrophilic. If there is water in the slab, which is quite common, then the other materials that use a salt as a pigment are pushed out of the slab. If the RH of the air is lower than the RH of the slab then the moisture will leave the slab and move into the air. If a pigment has been used to color the slab it will leave with the water. Another advantage to the coloring product of the invention is that it can be driven along with the silica of the compounds, such as the cutting compound of the invention, into the concrete, at least because the silica is porous and clear and the coloring product colors the silica and the silica penetrates the slab. The depth of penetration can be as much as about 10 to about 12 mm into the concrete slab, but may be greater. A non-limiting exemplary method of use of the coloring product of the invention is described as follows:

1. Cut until floor is smooth. Two passes with a head speed of 3-400 rps is sufficient.
2. Apply the coloring product at a rate of 400 sq ft per gallon. Floor MUST be dry prior to application of this material.
3. Apply Sher-Crete Clear Concrete Hardener to floor at 400-600 sq. ft. per gallon, leaving the product on the floor for at least 30 minutes.
5. Dry Polish floor using an 800 grit tool.
6. Scrub and rinse floor, if necessary.
7. Seal using Shercrete Sealer for Stained and Polished Concrete. Apply two coats cut 50/50 with water at a rate of 2000 square feet per gallons, using a Hudson sprayer and a microfiber applicator.
8. Burnish the floor with a Hogs hair or black pad.

It will be appreciated by those skilled in the art that while the invention has been described above in connection with particular embodiments and examples, the invention is not necessarily so limited, and that numerous other embodiments, examples, uses, modifications and departures from such embodiments, examples and uses are all intended to be encompassed by the spirit and scope of the invention as described herein and would be understood to one of ordinary skill in the art.

What is claimed is:

1. A method for grinding and polishing dried concrete, comprising the steps of:
    wetting a surface of dried concrete with a solution including colloidal silica, wherein the solution acts as an abrasive to facilitate removal of stock from the concrete surface;
    permitting the colloidal silica to penetrate the concrete surface over time;
    cutting the surface of the concrete with a bladed tool, the bladed tool having a blade portion at an approximate angle between 30 degrees and 90 degrees relative to the surface of the concrete; and
    applying pressure to the bladed tool to facilitate penetration and cross-linking of the silica with shavings of the concrete surface to harden the dried concrete.

2. The method of claim 1 wherein cutting occurs when the concrete surface is wet with the solution and the cutting forms a slurry of solution with silica and concrete cut from the surface of the concrete.

3. The method of claim 1 wherein the blade has a longitudinal blade portion that is at the angle between 30 degrees to 90 degrees relative to the surface of the concrete.

4. A method for cutting a surface of dried concrete, comprising the steps of:
    wetting the surface with a solution including colloidal silica, wherein the solution including silica acts as an abrasive to facilitate removal of stock from the surface of the dried concrete;
    permitting the colloidal silica to penetrate the surface over time;
    while the surface is wet with the solution including silica, cutting the surface of the dried concrete with a bladed tool;
    during the cutting of the surface, applying pressure to the bladed tool to force the bladed tool toward the dried concrete, the bladed tool attached to a machine having a weight such that the pressure applied to the bladed tool to force the bladed tool toward the dried concrete is greater than or equal to the pressure generated due to the weight of the machine; and
    rewetting the surface one or more times during cutting to maintain a slurry of silica and concrete cut from the surface of the dried concrete.

5. The method of claim 4 wherein applying pressure to the bladed tool facilitates penetration and cross-linking of the silica with shavings of the surface to harden the dried concrete.

6. The method of claim 4 the bladed tool having a blade portion that cuts the surface at an approximate angle between 30 degrees and 90 degrees relative to the surface of the dried concrete.

7. The method of claim 4 wherein the approximate angle of the bladed tool to the surface of the dried concrete is between 30 and 50 degrees.

8. The method of claim 4 wherein the approximate angle of the bladed tool to the surface of the dried concrete is approximately 90 degrees.

9. The method of claim 4 wherein the rewetting creates a slurry cream which facilitates movement of the blade portion as it cuts and acts as an abrasive.

10. A method for grinding and polishing a dried concrete slab, comprising the steps of:
    wetting a surface of the dried concrete slab with a solution including colloidal silica, wherein the solution acts as an abrasive to facilitate removal of stock from the dried concrete slab;
    permitting the silica to penetrate the dried concrete slab over time; and
    shaving the surface of the dried concrete slab while wet with the solution including silica, with a leading edge of a bladed tool to remove a portion of the dried concrete slab, the removed portion comprising slab shavings, while minimizing scratches in the surface of the dried concrete slab being shaved by the bladed tool.

11. The method of claim 10 further comprising applying pressure to the bladed tool from at least a weight of a machine to which the bladed tool is attached, the pressure provided to facilitate penetration and cross-linking of the silica with slab shavings into the dried concrete slab to harden the dried concrete slab.

12. The method of claim 11 wherein the silica with slab shavings is in a slurry, and the pressure forces penetration of the silica with slab shavings into the dried concrete slab.

13. The method of claim 10 further comprising maintaining the rewetting of the surface during shaving to draw the silica and slab shavings, from the dried concrete slab, into the dried concrete slab via capillary action.

14. The method of claim 10 wherein shaving the surface of the dried concrete slab shaves raised ridges off the dried concrete slab.

15. The method of claim 10 wherein the solution with colloidal silica has a substantially neutral pH.

16. The method of claim 10, wherein the bladed tool has a blade portion that shaves the surface of the dried concrete slab such that the blade portion is arranged at an approximate angle between 30 degrees and 90 degrees relative to the surface of the dried concrete slab.

* * * * *